US012313019B2

(12) United States Patent
Franke

(10) Patent No.: US 12,313,019 B2
(45) Date of Patent: May 27, 2025

(54) VALVE BRIDGE STABILIZER FOR ENGINE BRAKING

(71) Applicant: Eaton Intelligent Power Limited, Dublin (IE)

(72) Inventor: Brian W. Franke, Hamilton, IN (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/800,962

(22) Filed: Aug. 12, 2024

(65) Prior Publication Data

US 2024/0401539 A1 Dec. 5, 2024

Related U.S. Application Data

(63) Continuation of application No. PCT/EP2023/025117, filed on Mar. 15, 2023.

(60) Provisional application No. 63/319,914, filed on Mar. 15, 2022.

(51) Int. Cl.

*F01L 13/06* (2006.01)
*F01L 1/18* (2006.01)
*F02D 9/06* (2006.01)

(52) U.S. Cl.

CPC ................. *F02D 9/06* (2013.01); *F01L 1/18* (2013.01)

(58) Field of Classification Search

CPC ......... F01L 1/181; F01L 13/065; F01L 13/06; F01L 1/26; F02D 13/04
USPC ........................................................ 123/320
See application file for complete search history.

(56) References Cited

U.S. PATENT DOCUMENTS 3,520,287 A * 7/1970 Calvin .................... F01L 13/06 123/321
5,036,810 A * 8/1991 Meneely ............... F01L 13/065 123/321
5,353,756 A 10/1994 Murata
5,495,838 A 3/1996 Johnson
(Continued)

FOREIGN PATENT DOCUMENTS

CN 101769186 A 7/2010
CN 102459830 A 5/2012
(Continued)

OTHER PUBLICATIONS

U.S. Appl. No. 16/597,319, filed Oct. 9, 2019, McCarthy.
(Continued)

*Primary Examiner* — Long T Tran
*Assistant Examiner* — James J Kim
(74) *Attorney, Agent, or Firm* — Baker Botts L.L.P.

(57) ABSTRACT

A rocker assembly includes a valve bridge, a guidepost, and a spring. The valve bridge is operably associated with the rocker assembly and configured to engage a first exhaust valve and a second exhaust valve. The valve bridge includes an internal chamber extending into the valve bridge from a bottom side of the valve bridge. The guidepost is at least partially disposed within the internal chamber. The guidepost is secured to a valvetrain carrier and extends upwards to the valve bridge. The valve bridge is configured to translate along the guidepost. The spring is disposed around the guidepost. A first end of the spring is disposed on a top surface of the valvetrain carrier, and a second end of the spring is disposed against the bottom side of the valve bridge.

20 Claims, 6 Drawing Sheets

(56) References Cited

U.S. PATENT DOCUMENTS

| | | | | | |
|---|---|---|---|---|---|
| 5,535,710 | A * | 7/1996 | Zoschke | F01L 1/26 123/90.46 |
| 5,626,110 | A * | 5/1997 | Regueiro | F01L 1/20 123/90.22 |
| 5,645,023 | A * | 7/1997 | Regueiro | F01L 1/14 123/90.22 |
| 5,682,849 | A * | 11/1997 | Regueiro | F01L 1/262 123/90.22 |
| 5,806,477 | A | 9/1998 | Regueiro | |
| 5,975,251 | A | 11/1999 | McCarthy | |
| 5,992,376 | A | 11/1999 | Okada | |
| 6,234,143 | B1 | 5/2001 | Bartel | |
| 6,253,730 | B1 | 7/2001 | Gustafson | |
| 6,422,186 | B1 | 7/2002 | Vanderpoel | |
| 6,975,251 | B2 | 12/2005 | Pavicic | |
| 7,617,807 | B2 | 11/2009 | Diggs | |
| 7,900,597 | B2 | 3/2011 | Meneely | |
| 8,037,865 | B2 | 10/2011 | Meneely | |
| 8,272,363 | B2 | 9/2012 | Meneely | |
| 8,430,072 | B2 | 4/2013 | Burkhard | |
| 8,573,171 | B2 | 11/2013 | Cecur | |
| 8,800,520 | B2 | 8/2014 | D'Amore | |
| 8,813,719 | B2 | 8/2014 | Sailer | |
| 9,016,249 | B2 | 4/2015 | Roberts | |
| 9,371,780 | B2 | 6/2016 | Toth | |
| 9,429,051 | B2 | 8/2016 | Meneely | |
| 9,512,745 | B2 | 12/2016 | Cecur | |
| 9,879,575 | B2 * | 1/2018 | Erdman | F01M 9/103 |
| 10,190,446 | B2 | 1/2019 | Cecur | |
| 10,260,382 | B2 | 4/2019 | Cecur | |
| 10,465,567 | B2 | 11/2019 | Nielsen | |
| 10,590,810 | B2 | 3/2020 | Ferreira | |
| 10,626,758 | B2 | 4/2020 | McCarthy | |
| 10,626,763 | B2 | 4/2020 | Jo | |
| 10,690,024 | B2 | 6/2020 | Vanwingerden | |
| 10,858,963 | B2 | 12/2020 | Nielsen | |
| 10,927,724 | B2 | 2/2021 | Nielsen | |
| 11,092,042 | B2 | 8/2021 | McCarthy | |
| 11,339,690 | B2 | 5/2022 | Vanwingerden | |
| 11,598,228 | B2 | 3/2023 | McCarthy | |
| 2002/0174654 | A1 | 11/2002 | Yang | |
| 2005/0211206 | A1 | 9/2005 | Ruggiero | |
| 2006/0000432 | A1 * | 1/2006 | Yamamoto | F01L 1/46 123/90.22 |
| 2006/0225684 | A1 | 10/2006 | Spath | |
| 2008/0006231 | A1 | 1/2008 | Noss | |
| 2008/0072857 | A1 | 3/2008 | Sailer | |
| 2008/0087239 | A1 | 4/2008 | Wiley | |
| 2009/0250023 | A1 * | 10/2009 | Minato | F01L 1/181 123/90.15 |
| 2010/0024767 | A1 | 2/2010 | Meneely | |
| 2010/0319657 | A1 | 12/2010 | Dodi | |
| 2011/0067661 | A1 | 3/2011 | Schwoerer | |
| 2011/0079195 | A1 | 4/2011 | Dilly | |
| 2011/0220062 | A1 | 9/2011 | Sailer | |
| 2012/0024260 | A1 | 2/2012 | Groth | |
| 2012/0048232 | A1 | 3/2012 | Meistrick | |
| 2012/0186546 | A1 | 7/2012 | Cecur | |
| 2012/0298057 | A1 | 11/2012 | Janak | |
| 2013/0298859 | A1 | 11/2013 | D'Amore | |
| 2014/0083381 | A1 | 3/2014 | Roberts | |
| 2014/0130774 | A1 | 5/2014 | Le | |
| 2014/0251266 | A1 | 9/2014 | Emmons | |
| 2015/0144096 | A1 | 5/2015 | Meneely | |
| 2015/0159520 | A1 | 6/2015 | Cecur | |
| 2015/0354418 | A1 | 12/2015 | Jo | |
| 2016/0281612 | A1 | 9/2016 | Toth | |
| 2016/0305293 | A1 | 10/2016 | Meneely | |
| 2016/0356187 | A1 | 12/2016 | Meneely | |
| 2017/0016358 | A1 | 1/2017 | Yoon | |
| 2017/0175597 | A1 | 6/2017 | Cecur | |
| 2017/0241305 | A1 | 8/2017 | Xi | |
| 2017/0276034 | A1 | 9/2017 | Cecur | |
| 2017/0321576 | A1 | 11/2017 | Nielsen | |
| 2018/0003088 | A1 | 1/2018 | Nielsen | |
| 2018/0087412 | A1 | 3/2018 | Andrisani | |
| 2018/0163578 | A1 | 6/2018 | Kim | |
| 2018/0223701 | A1 | 8/2018 | Hattiangadi | |
| 2019/0010835 | A1 | 1/2019 | McCarthy | |
| 2019/0055861 | A1 | 2/2019 | Persson | |
| 2019/0085738 | A1 | 3/2019 | Vanwingerden | |
| 2019/0107011 | A1 | 4/2019 | Contarin | |
| 2019/0145289 | A1 | 5/2019 | Ferreira | |
| 2019/0264584 | A1 | 8/2019 | Baltrucki | |
| 2020/0182098 | A1 | 6/2020 | McCarthy | |
| 2021/0071548 | A1 | 3/2021 | Boz | |
| 2021/0372299 | A1 | 12/2021 | Edke | |

FOREIGN PATENT DOCUMENTS

| | | | |
|---|---|---|---|
| CN | 102472124 | A | 5/2012 |
| CN | 102650224 | A | 8/2012 |
| CN | 102840005 | A | 12/2012 |
| CN | 203271844 | U | 11/2013 |
| CN | 205779084 | U | 12/2016 |
| CN | 107100693 | A | 8/2017 |
| EP | 1477638 | B1 | 12/2008 |
| GB | 2443419 | A | 5/2008 |
| WO | WO 2014001560 | A1 | 1/2014 |
| WO | WO 2015191663 | A1 | 12/2015 |
| WO | WO 2017160379 | A1 | 9/2017 |

OTHER PUBLICATIONS

U.S. Appl. No. 16/792,521, filed Feb. 17, 2020, McCarthy.
U.S. Appl. No. 16/831,965, filed Mar. 27, 2020, Nielsen.
Intonational Search Report and Written Opinion for International Application No. PCT/US2016/013992 mailed May 25, 2016, 8 pages.
International Search Report and Written Opinion for International Application No. PCT/US2016/069452 mailed Apr. 24, 2017, 15 pages.
International Search Report and Written Opinion for International Application No. PCT/US2017/026541 mailed Jul. 20, 2017, 15 pages.
International Search Report and Written Opinion for International Application No. PCT/US/2019/041649 mailed Nov. 6, 2019, 10 pages.
International Search Report and Written Opinion for International Application No. PCT/EP2023/025117 mailed Jun. 15, 2023, 8 pages.

* cited by examiner

VALVE BRIDGE STABILIZER FOR ENGINE BRAKING

PRIORITY

This application claims the benefit under 35 U.S.C. § 365 (c) of International Patent Application No. PCT/EP2023/025117, filed 15 Mar. 2023, which claims the under 35 U.S.C. § 119(e) of U.S. Provisional Patent Application No. 63/319,914, filed 15 Mar. 2022, all of which are incorporated herein by reference.

TECHNICAL FIELD

The present disclosure relates generally to engine braking and, more particularly, to valve bridge stabilizer for engine braking.

BACKGROUND

Internal combustion engines typically use either a mechanical, electrical, or hydro-mechanical valve actuation system to actuate the engine valves. These systems may include a combination of camshafts, rocker arms and push rods that are driven by the engine's crankshaft rotation. In a typical valvetrain assembly used with a compression engine brake, the exhaust valve is actuated by a rocker arm which engages the exhaust valve by means of a valve bridge. The rocker arm rocks in response to a cam on a rotating cam shaft and presses down on the valve bridge which itself presses down on the exhaust valve to open it. Existing valve bridges may tilt in response to engine braking and may provide pump-up in a hydraulic lash adjuster (HLA) assembly coupled at an end of an exhaust rocker arm.

SUMMARY OF PARTICULAR EMBODIMENTS

In particular embodiments, a rocker assembly includes: an exhaust rocker arm configured to selectively open a first exhaust valve and a second exhaust valve; a valve bridge operably associated with the rocker arm assembly and configured to engage the first exhaust valve and the second exhaust valve, the valve bridge includes an internal chamber extending into the valve bridge from a bottom side of the valve bridge; a guidepost at least partially disposed within the internal chamber, the guidepost is secured to a valvetrain carrier and extends upwards to the valve bridge, the valve bridge is configured to translate along the guidepost; a spring disposed around the guidepost, a first end of the spring is disposed on a top surface of the valvetrain carrier, and a second end of the spring is disposed against the bottom side of the valve bridge; and a brake rocker arm configured to selectively open the second exhaust valve.

In particular embodiments, the guidepost includes a shoulder operable to receive a clip.

In particular embodiments, the rocker assembly further includes a clip disposed around the guidepost and between the second end of the spring and the bottom side of the valve bridge. The clip is configured to abut against the shoulder of the guidepost based on operation of the spring.

In particular embodiments, the valve bridge further includes a central bore disposed through a first side and a second side of the valve bridge. The internal chamber extends to the central bore.

In particular embodiments, the exhaust rocker arm and the brake rocker arm are integrated into a singular, dual rocker arm.

In particular embodiments, the second exhaust valve is coupled to a cleat in a pass-through defined in the valve bridge.

In particular embodiments, the rocker assembly further includes a hydraulic lash adjuster (HLA) assembly coupled at an end of the exhaust rocker arm operable to engage with the valve bridge.

In particular embodiments, a valve assembly includes: a valve bridge configured to engage a first exhaust valve and a second exhaust valve, the valve bridge includes an internal chamber extending into the valve bridge from a bottom side of the valve bridge; the first exhaust valve secured in relation to the valve bridge; the second exhaust valve secured in relation to the valve bridge; a guidepost at least partially disposed within the internal chamber, the valve bridge is configured to translate along the guidepost; and a spring disposed around the guidepost, a first end of the spring is disposed on a top surface of a valvetrain carrier, and a second end of the spring is disposed against the bottom side of the valve bridge.

In particular embodiments, the guidepost includes a shoulder operable to receive a clip.

In particular embodiments, the valve assembly further includes a clip disposed around the guidepost and between the second end of the spring and the bottom side of the valve bridge. The clip is configured to abut against the shoulder of the guidepost based on operation of the spring.

In particular embodiments, the valve bridge further includes a central bore disposed through a first side and a second side of the valve bridge. The internal chamber extends to the central bore.

In particular embodiments, the second exhaust valve is coupled to a cleat in a pass-through defined in the valve bridge.

In particular embodiments, a valvetrain assembly includes: a first exhaust valve; a second exhaust valve; a rocker assembly including an exhaust rocker arm configured to selectively open the first exhaust valve and the second exhaust valve, and a brake rocker arm configured to selectively open the second exhaust valve; a valve bridge operably associated with the rocker arm assembly and configured to engage the first exhaust valve and the second exhaust valve, the valve bridge includes an internal chamber extending into the valve bridge from a bottom side of the valve bridge; a guidepost at least partially disposed within the internal chamber, the guidepost is secured to a valvetrain carrier and extends upwards to the valve bridge, the valve bridge is configured to translate along the guidepost; and a spring disposed around the guidepost, a first end of the spring is disposed on a top surface of the valvetrain carrier, and a second end of the spring is disposed against the bottom side of the valve bridge.

In particular embodiments, the guidepost includes a shoulder operable to receive a clip.

In particular embodiments, the valvetrain assembly further includes a clip disposed around the guidepost and between the second end of the spring and the bottom side of the valve bridge. The clip is configured to abut against the shoulder of the guidepost based on operation of the spring.

In particular embodiments, the valve bridge further includes a central bore disposed through a first side and a second side of the valve bridge. The internal chamber extends to the central bore.

In particular embodiments, the second exhaust valve is coupled to a cleat in a pass-through defined in the valve bridge.

In particular embodiments, the exhaust rocker arm and the brake rocker arm are integrated into a singular, dual rocker arm.

In particular embodiments, the valvetrain assembly further includes a hydraulic lash adjuster (HLA) assembly coupled at an end of the exhaust rocker arm operable to engage with the valve bridge.

In particular embodiments, the spring is configured to apply a force approximately equivalent to a weight of the valve bridge upwards against the valve bridge during a brake mode.

BRIEF DESCRIPTION OF THE DRAWINGS

The following figures are included to illustrate certain aspects of the present disclosure and should not be viewed as exclusive embodiments. The subject matter disclosed is capable of considerable modifications alterations combinations, and equivalents in form and function, without departing from the scope of this disclosure.

DESCRIPTION OF EXAMPLE EMBODIMENTS

Figure 1:
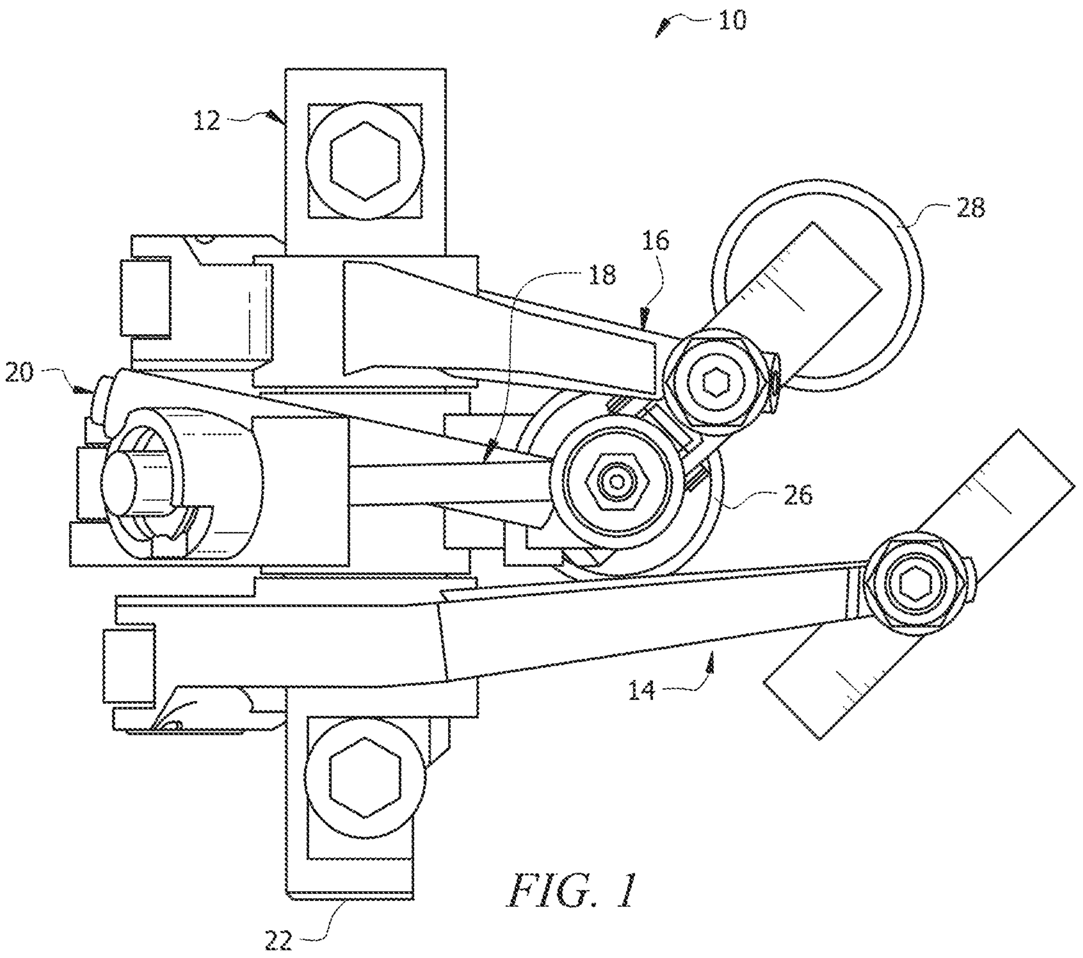
FIG. 1 illustrates a plan view of a valve train assembly incorporating a rocker arm assembly that includes an intake rocker arm assembly, an exhaust rocker arm assembly, and an engine brake rocker arm assembly, according to one or more aspects of the present disclosure.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "la" refers to an instance of a widget class, which may be referred to collectively as widgets "1" and any one of which may be referred to generically as a widget "1". In the figures and the description, like numerals are intended to represent like elements.

The terms "couple" or "couples," as used herein, are intended to mean either an indirect or direct connection. Thus, if a first device couples to a second device, that connection may be through a direct connection, or through an indirect electrical connection or a shaft coupling via other devices and connections.

To facilitate a better understanding of the present disclosure, the following examples of certain embodiments are given. In no way should the following examples be read to limit, or define, the scope of the disclosure. Embodiments described below with respect to one implementation are not intended to be limiting.

With initial reference to FIG. 1, a partial valvetrain assembly constructed in accordance to one example of the present disclosure is shown and generally identified at reference 10. The partial valvetrain assembly 10 may utilize engine braking and is shown configured for use in a three-cylinder bank portion of a six-cylinder engine. It will be appreciated however that the present teachings are not so limited. In this regard, the present disclosure may be used in any valvetrain assembly that utilizes engine braking. The partial valvetrain assembly 10 may be supported in a valvetrain carrier 12 and may include three rocker arms per cylinder. In other embodiments, a portion of the rocker arms, such as an exhaust valve rocker arm assembly and an engine brake rocker arm assembly may be combined into a single rocker arm and may collectively be referred to as a combined exhaust and engine brake rocker arm assembly, which cooperates to control the opening of exhaust valves.

Specifically, each cylinder may include an intake valve rocker arm assembly 14, an exhaust valve rocker arm assembly 16, and an engine brake rocker arm assembly 18. The exhaust valve rocker arm assembly 16 and the engine brake rocker arm assembly 18 may cooperate to control opening of first and second exhaust valves 26 and 28 and may collectively be referred to as a dual rocker arm assembly 20. The intake valve rocker arm assembly 14 may be configured to control motion of the intake valves, the exhaust valve rocker arm assembly 16 may be configured to control exhaust valve motion in a drive mode, and the engine brake rocker arm assembly 18 may be configured to act on one of the two exhaust valves in an engine brake mode, as will be described herein. In alternative configurations, the exhaust valve rocker arm assembly 16 and the engine brake rocker arm assembly 18 may be combined into a single rocker arm referred to as a combined exhaust and engine brake rocker arm assembly.

A rocker shaft 22 may be received by the valve train carrier 12 and may support rotation of the exhaust valve rocker arm assembly 16 and the engine brake rocker arm assembly 18. As described herein, the rocker shaft 22 may communicate oil to the assemblies 16, 18 during operation. A cam shaft may be included in the valvetrain assembly 10 and may comprise lift profiles or cam lobes configured to rotate assemblies 16, 18 to activate first and second exhaust valves 26 and 28.

Figure 2A:
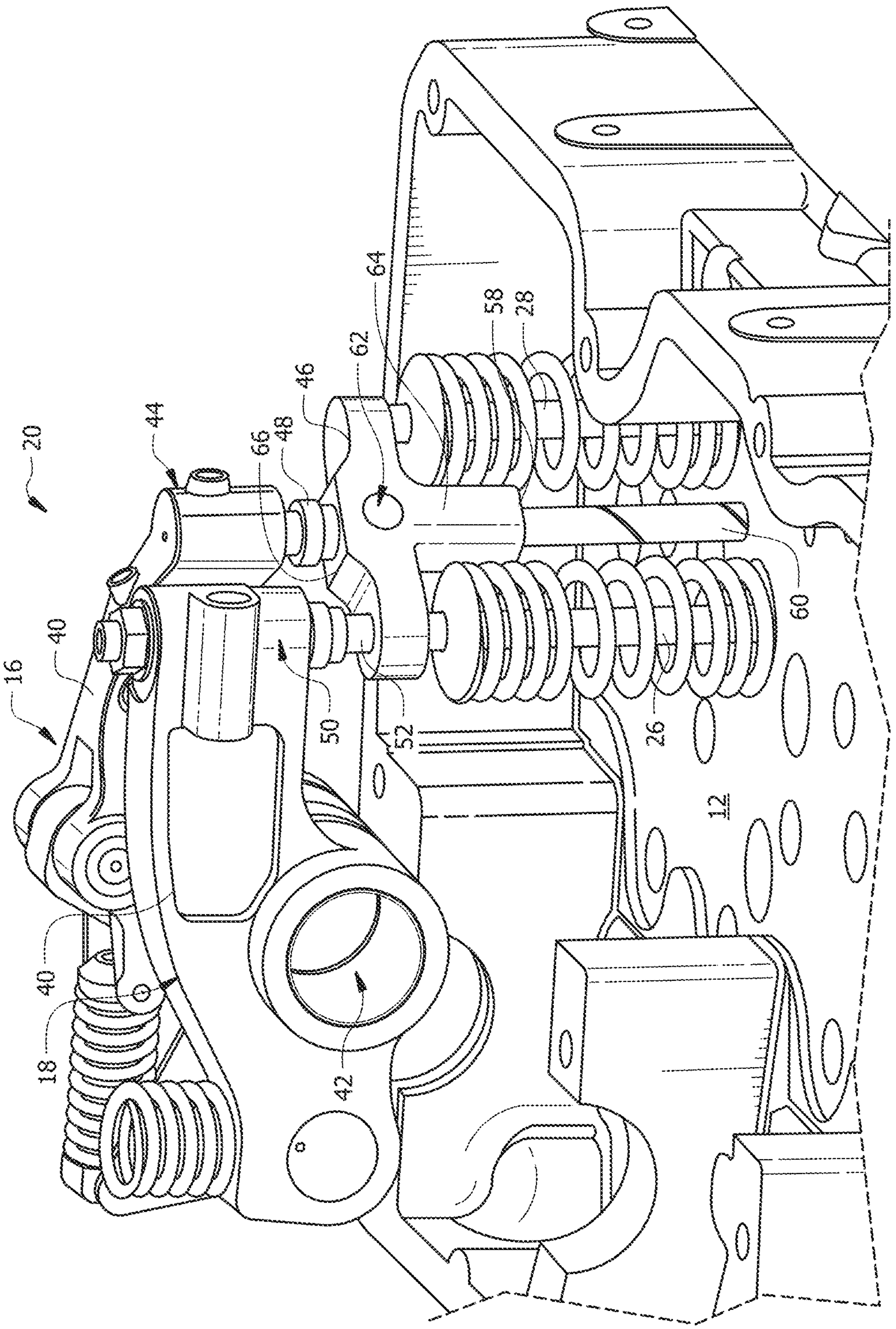
FIG. 2A illustrates a perspective view of the exhaust rocker arm assembly and engine brake rocker arm assembly shown in FIG. 1, according to one or more aspects of the present disclosure.
Figure 2B:
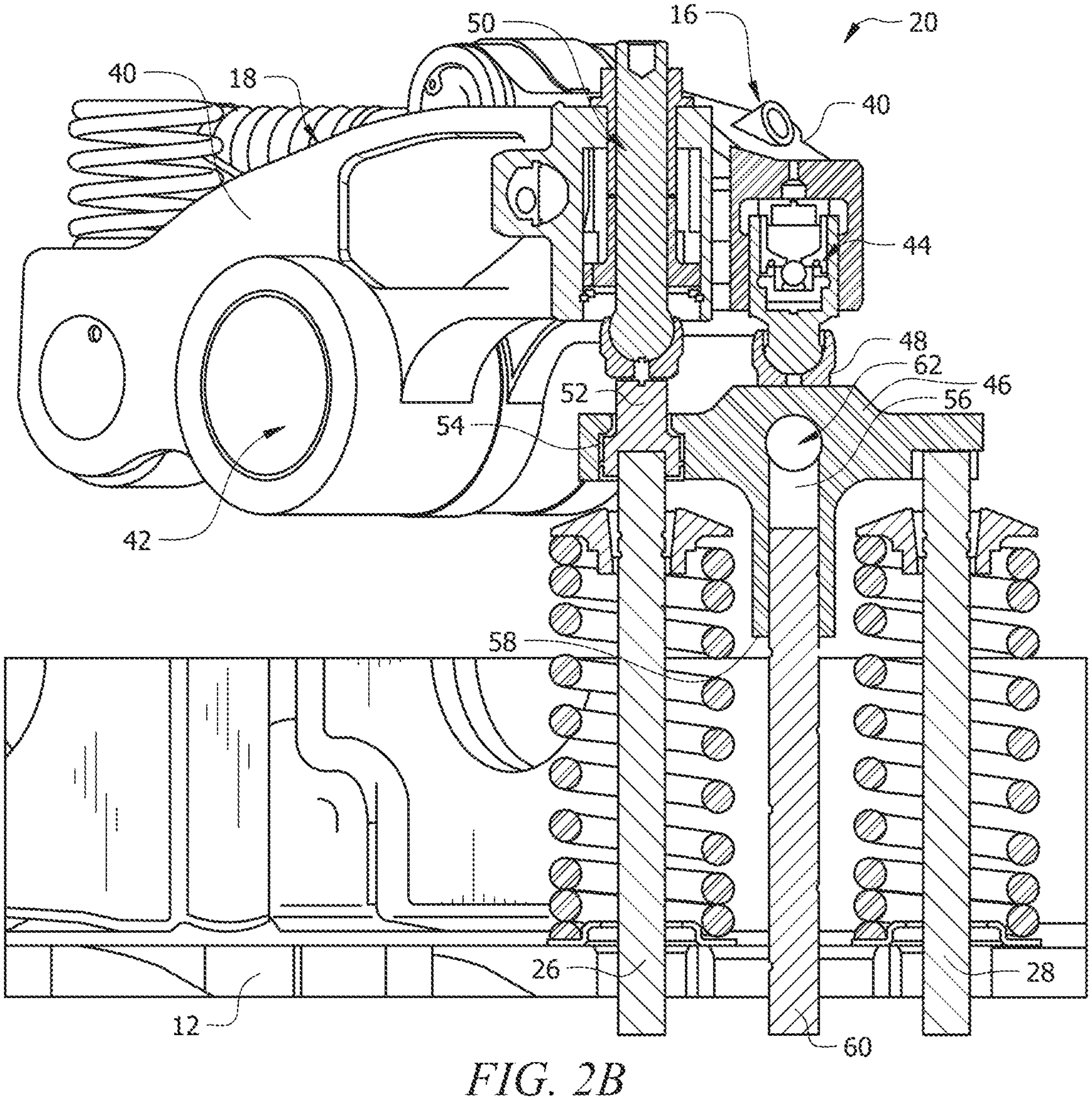
FIG. 2B illustrates a partial cross-sectional view of the exhaust rocker arm assembly and engine brake rocker arm assembly shown in FIG. 2A, according to one or more aspects of the present disclosure.

FIGS. 2A-2B illustrate the dual rocker arm assembly 20. Each of the exhaust valve rocker arm assembly 16 and the engine brake rocker arm assembly 18 may generally include a rocker arm 40 and a center pivot bore 42. Rocker arm 40 may receive the rocker shaft 22 (referring to FIG. 1) through the center pivot bore 42 and may rotate about the center pivot bore 42. The exhaust valve rocker arm assembly 16 may comprise a capsule assembly 44 operable to engage with a valve bridge 46. In embodiments, the capsule assembly 44 may be a hydraulic lash adjuster (HLA) assembly coupled at an end of the exhaust rocker arm operable to engage with the valve bridge. The capsule assembly 44 may be configured to take up any lash between the exhaust valve rocker arm assembly 16 and the valve bridge 46. In the example implementation, the capsule assembly 44 may generally include an e-foot 48 configured to engage with the valve bridge 46. Once the capsule assembly 44 is actuated to an extended position, it may apply a force onto the valve bridge 46 and cause downward movement of the valve bridge 46, which engages the first and second exhaust valve 26 and 28 associated with a cylinder of an engine (not shown).

The engine brake rocker arm assembly 18 may comprise an engine brake actuator 50 operable to extend towards and retract away from the valve bridge 46. When a roller is engaged by an engine brake lift profile of a cam shaft, the engine brake actuator 50 may be rotated downward, causing downward movement of only the first exhaust valve 26 (i.e., not valve 28), as the first exhaust valve 26 may be coupled to a cleat 52 in a pass-through 54 defined in the valve bridge 46. In embodiments, actuation by the capsule 44 may push the valve bridge 46 downwards, subsequently displacing both the first and second exhaust valves 26, 28. Actuation by the engine brake actuator 50 may only push downwards against the cleat 52, thereby pushing the first exhaust valve downwards independent from the valve bridge 46.

Figure 2C:
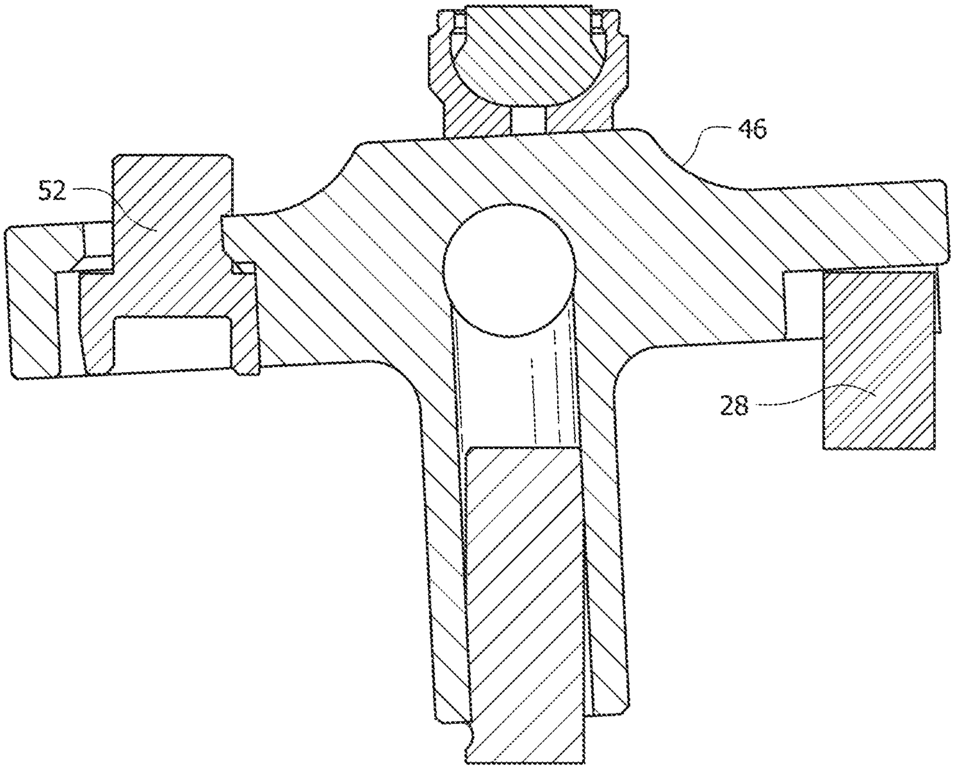
FIG. 2C illustrates a front view of a valve bridge, according to one or more aspects of the present disclosure.

With reference now to FIG. 2C, as the cleat 52 and first exhaust valve 26 (referring to FIG. 1) translate downwards, the valve bridge 46 may experience gravitational pull about that portion of the valve bridge 46 as the first exhaust valve 26 is no longer supporting that side of the valve bridge 46. The second exhaust valve 28 may be supporting an opposite side of the valve bridge 46, and the valve bridge 46 may tilt downwards towards the first exhaust valve 26 about an edge of the second exhaust valve 28. This may cause bridge binding or over adjustment of an automatic lash adjusting system, such as the capsule assembly 44 (referring to FIGS. 2A-2B). For example, as the valve bridge 46 tilts, a gap may be created within the capsule assembly 44 that is then filled with fluid. As the first exhaust valve 26 attempts to be re-seated, the additional fluid in the capsule assembly 44 may prevent the first exhaust valve 26 from fully closing against its seat.

Referring back to FIGS. 2A-2B, the valve bridge 46 may be configured to mitigate at least a portion of the bridge binding or over adjustment of the capsule assembly 44. For example, the valve bridge 46 may comprise an internal chamber 56 extending into the valve bridge 46 from a bottom side 58 of the valve bridge 46. A guidepost 60 may be at least partially disposed within the internal chamber 56, wherein the guidepost 60 is secured to the valvetrain carrier 12 and extends upwards to the valve bridge 46. In embodiments, during operations, the valve bridge 46 is configured to translate along the guidepost 60 when experiencing an external force from the dual rocker arm assembly 20. The valve bridge 46 may further comprise a central bore 62 disposed through a first side 64 and a second side 66 of the valve bridge 46, wherein the internal chamber 56 extends to the central bore 62. The central bore 62 may be configured to provide pressure relief for the internal chamber 56 as the valve bridge 46 translates with respect to the guidepost 60.

Figure 3:
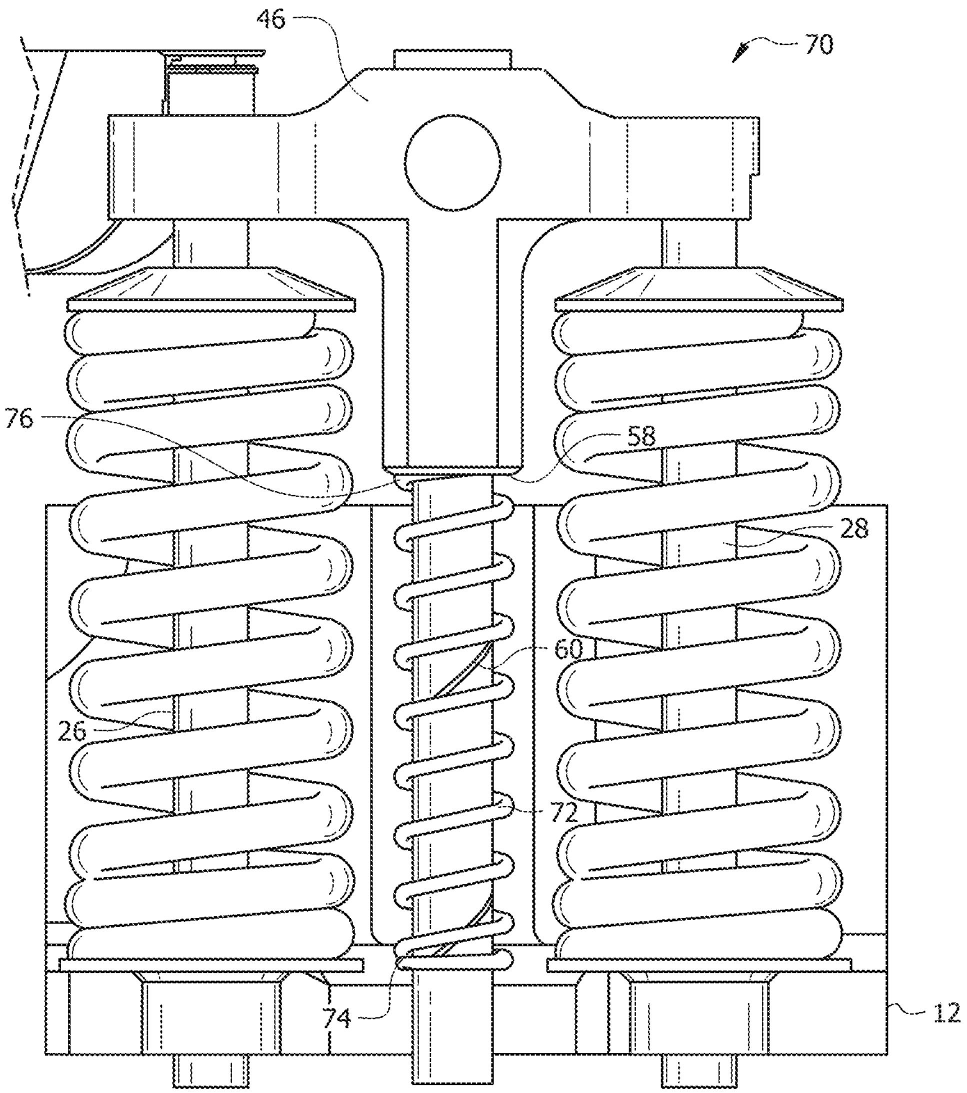
FIG. 3 illustrates a front view of a valve assembly, according to one or more aspects of the present disclosure.
Figure 4:
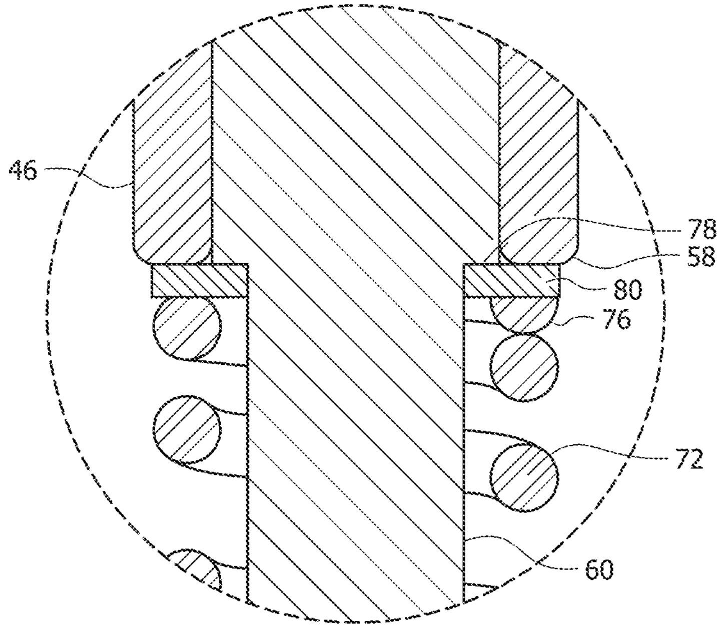
FIG. 4 illustrates another embodiment of a valve assembly, according to one or more aspects of the present disclosure.

FIGS. 3-4 illustrate embodiments of an improved valve assembly 70, according to one or more aspects of the present disclosure. FIG. 3 illustrates a front view of the valve assembly 70, and FIG. 4 illustrates another embodiment of the valve assembly 70. The valve assembly 70 may be a portion of the valvetrain assembly 10 (referring to FIG. 1) and may include the first and second exhaust valves 26, 28, the valve bridge 46, the guidepost 60, and a spring 72. As illustrated, the spring 72 may be disposed around the guidepost 60. A first end 74 of the spring 72 may be disposed on a top surface of the valvetrain carrier 12, and a second end 76 of the spring 72 may be disposed against the bottom side 58 of the valve bridge 46. The spring 72 may be configured to bias the valve bridge 46 in an upwards direction, wherein a spring force of the spring 72 may be about the same as or approximately equal to a weight of the valve bridge 46. The spring 72 may be configured to stabilize the valve bridge 46 during operations of the dual rocker arm assembly 20 (referring to FIG. 1). The spring 72 may be any suitable size, height, shape, and any combinations thereof. Further, the spring 72 may comprise any suitable materials, such as metals, nonmetals, polymers, composites, and any combinations thereof. While a spring is illustrated as the referenced spring 72, the present disclosure is not limited to such an understanding. For example, any other suitable component compliant to support the valve bridge 46 may be used as the spring 72.

As best seen in FIG. 4, the guidepost 60 may comprise a shoulder 78 configured to receive a clip 80. The clip 80 may be disposed around the guidepost 60 and between the second end 76 of the spring 72 and the bottom side 58 of the valve bridge 46. In one or more embodiments, the clip 80 may be a fastener, such as a washer. The clip 80 may be configured to abut against the shoulder 78 in response to operation of the spring 72. In embodiments, the clip 80 may function as a stopping mechanism for the valve bridge 46 in relation to the guidepost 60. For example, during operations, the exhaust valve rocker arm assembly 16 (referring to FIG. 1) may be actuated to apply a force downwards upon the valve bridge 46. The valve bridge 46 may translate downwards with respect to the guidepost 60 for a distance. The spring 72 may be compressed as the force is transmitted through the valve bridge 46 and onto the spring 72. Once the applied force stops or is reduced, the spring 72 may be configured to expand and push up against the valve bridge 46. With the expansion of the spring 72, the valve bridge 46 may translate back in an upward direction. Because the clip 80 may be disposed around the guidepost 60 between the spring 72 and valve bridge 46, the clip 80 may be seated against the shoulder 78 during and after the expansion of the spring 72, thereby preventing the spring 72 from further expansion and preventing further translation of the valve bridge 46 in that direction. In another example, during operations, the engine brake rocker arm assembly 18 (referring to FIG. 1) may be actuated to apply a force downwards upon the first exhaust valve 26 independent from the valve bridge 46. With the temporary removal of support by the first exhaust valve 26, the tilting of the valve bridge 46 due to gravitational forces may be mitigated through usage of the spring 72. In this example, the spring 72 may be configured to support the weight of the valve bridge 46 as the first exhaust valve 26 is opened. In embodiments, the spring 72 may be compliant enough to compress when acted upon by the exhaust valve rocker arm assembly 16 and stiff enough to maintain structural integrity when the first exhaust valve 26 is opened independent from the second exhaust valve 28.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an." as used in the claims, are defined herein to mean one or more than one of the elements that it introduces.

What is claimed is:

1. A rocker assembly, comprising:

an exhaust rocker arm configured to selectively open a first exhaust valve and a second exhaust valve;

a valve bridge operably associated with the rocker arm assembly and configured to engage the first exhaust valve and the second exhaust valve, wherein the valve bridge comprises an internal chamber extending into the valve bridge from a bottom side of the valve bridge;

a guidepost at least partially disposed within the internal chamber, wherein the guidepost is secured to a valvetrain carrier and extends upwards to the valve bridge, wherein the valve bridge is configured to translate along the guidepost;

a spring disposed around the guidepost, wherein a first end of the spring is disposed on a top surface of the valvetrain carrier, and wherein a second end of the spring is disposed against the bottom side of the valve bridge; and a brake rocker arm configured to selectively open the second exhaust valve.

2. The rocker assembly of claim 1, wherein the guidepost comprises a shoulder operable to receive a clip.

3. The rocker assembly of claim 2, further comprising a clip disposed around the guidepost and between the second end of the spring and the bottom side of the valve bridge, wherein the clip is configured to abut against the shoulder of the guidepost based on operation of the spring.

4. The rocker assembly of claim 1, wherein the valve bridge further comprises a central bore disposed through a first side and a second side of the valve bridge, wherein the internal chamber extends to the central bore.

5. The rocker assembly of claim 1, wherein the exhaust rocker arm and the brake rocker arm are integrated into a singular, dual rocker arm.

6. The rocker assembly of claim 1, wherein the second exhaust valve is coupled to a cleat in a pass-through defined in the valve bridge.

7. The rocker assembly of claim 1, further comprising a hydraulic lash adjuster (HLA) assembly coupled at an end of the exhaust rocker arm operable to engage with the valve bridge.

8. A valve assembly, comprising:

a valve bridge configured to engage a first exhaust valve and a second exhaust valve, wherein the valve bridge comprises an internal chamber extending into the valve bridge from a bottom side of the valve bridge;

the first exhaust valve secured in relation to the valve bridge;

the second exhaust valve secured in relation to the valve bridge;

a guidepost at least partially disposed within the internal chamber, wherein the valve bridge is configured to translate along the guidepost; and a spring disposed around the guidepost, wherein a first end of the spring is disposed on a top surface of a valvetrain carrier, and wherein a second end of the spring is disposed against the bottom side of the valve bridge.

9. The valve assembly of claim 8, wherein the guidepost comprises a shoulder operable to receive a clip.

10. The valve assembly of claim 9, further comprising a clip disposed around the guidepost and between the second end of the spring and the bottom side of the valve bridge, wherein the clip is configured to abut against the shoulder of the guidepost based on operation of the spring.

11. The valve assembly of claim 8, wherein the valve bridge further comprises a central bore disposed through a first side and a second side of the valve bridge, wherein the internal chamber extends to the central bore.

12. The valve assembly of claim 8, wherein the second exhaust valve is coupled to a cleat in a pass-through defined in the valve bridge.

13. A valvetrain assembly, comprising:

a first exhaust valve;

a second exhaust valve;

a rocker assembly, comprising:

an exhaust rocker arm configured to selectively open the first exhaust valve and the second exhaust valve; and a brake rocker arm configured to selectively open the second exhaust valve;

a valve bridge operably associated with the rocker arm assembly and configured to engage the first exhaust valve and the second exhaust valve, wherein the valve bridge comprises an internal chamber extending into the valve bridge from a bottom side of the valve bridge;

a guidepost at least partially disposed within the internal chamber, wherein the guidepost is secured to a valvetrain carrier and extends upwards to the valve bridge, wherein the valve bridge is configured to translate along the guidepost; and a spring disposed around the guidepost, wherein a first end of the spring is disposed on a top surface of the valvetrain carrier, and wherein a second end of the spring is disposed against the bottom side of the valve bridge.

14. The valvetrain assembly of claim 13, wherein the guidepost comprises a shoulder operable to receive a clip.

15. The valvetrain assembly of claim 14, further comprising a clip disposed around the guidepost and between the second end of the spring and the bottom side of the valve bridge, wherein the clip is configured to abut against the shoulder of the guidepost based on operation of the spring.

16. The valvetrain assembly of claim 13, wherein the valve bridge further comprises a central bore disposed through a first side and a second side of the valve bridge, wherein the internal chamber extends to the central bore.

17. The valvetrain assembly of claim 13, wherein the second exhaust valve is coupled to a cleat in a pass-through defined in the valve bridge.

18. The valvetrain assembly of claim 13, wherein the exhaust rocker arm and the brake rocker arm are integrated into a singular, dual rocker arm.

19. The valvetrain assembly of claim 13, further comprising a hydraulic lash adjuster (HLA) assembly coupled at an end of the exhaust rocker arm operable to engage with the valve bridge.

20. The valvetrain assembly of claim 13, wherein the spring is configured to apply a force approximately equivalent to a weight of the valve bridge upwards against the valve bridge during a brake mode.

* * * * *